United States Patent
Monma et al.

(10) Patent No.: US 10,107,401 B2
(45) Date of Patent: Oct. 23, 2018

(54) SEALING STRUCTURE

(71) Applicant: NOK CORPORATION, Tokyo (JP)

(72) Inventors: Hiroaki Monma, Fujisawa (JP);
Mitsuo Watanabe, Kitaibaraki (JP);
Shuji Yoshitsune, Aso (JP); Kota Henmi, Aso (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/511,880

(22) PCT Filed: Aug. 28, 2015

(86) PCT No.: PCT/JP2015/074388
§ 371 (c)(1),
(2) Date: Mar. 16, 2017

(87) PCT Pub. No.: WO2016/047369
PCT Pub. Date: Mar. 31, 2016

(65) Prior Publication Data
US 2017/0292607 A1 Oct. 12, 2017

(30) Foreign Application Priority Data
Sep. 24, 2014 (JP) .................................. 2014-194418

(51) Int. Cl.
*F16J 15/24* (2006.01)
*F16J 15/34* (2006.01)
*F16J 15/00* (2006.01)

(52) U.S. Cl.
CPC .......... *F16J 15/24* (2013.01); *F16J 15/3416* (2013.01); *F16J 15/008* (2013.01)

(58) Field of Classification Search
CPC ......... F16J 15/24; F16J 15/3416; F16J 15/166
See application file for complete search history.

(56) References Cited

U.S. PATENT DOCUMENTS 2,616,731 A * 11/1952 Osmun ................. F16J 15/56
277/322
2,809,080 A * 10/1957 Mittell ................. F16J 15/166
277/458
(Continued)

FOREIGN PATENT DOCUMENTS

EP 3118493 A1 1/2017
FR 2009066 A1 1/1970
(Continued)

OTHER PUBLICATIONS

Chinese Office Action dated Nov. 3, 2017 with English translation (corresponding to Chinese Application No. 201580049621.1).
(Continued)

*Primary Examiner* — Eugene G Byrd
(74) *Attorney, Agent, or Firm* — Harness, Dickey & Pierce, P.L.C.

(57) ABSTRACT

A sealing structure suppresses possible damage to a seal ring because of a backup ring. The sealing structure is characterized in that a cut portion 150 that is cut in a planar shape is formed in a backup ring 100 at one position in a circumferential direction, the cut portion 150 is configured such that a cut surface 153 is oblique to a central axis of the backup ring 100, an acute angle of angles between a surface on the high pressure side of the backup ring 100 and the cut surface 153 is set to not less than 15° and not more than 30°, and the backup ring 100 is formed of a resin material having Rockwell hardness of 100 or less, durometer hardness of 70 or less, and elastic modulus of 1.0 GPa or less.

3 Claims, 7 Drawing Sheets

(56) References Cited

U.S. PATENT DOCUMENTS

| | | | |
|---|---|---|---|
| 4,468,041 A | 8/1984 | Yoshimura et al. | |
| 4,840,379 A * | 6/1989 | Thoman, Jr. | F16J 9/14 277/468 |
| 5,118,119 A * | 6/1992 | Ditlinger | F16J 15/166 277/448 |
| 9,080,672 B2 * | 7/2015 | Matsumoto | F16J 15/18 |
| 9,273,655 B2 * | 3/2016 | Tadano | F02M 61/14 |
| 9,777,839 B2 * | 10/2017 | Monma | F16J 15/166 |
| 2008/0018059 A1 * | 1/2008 | Otuka | F16J 15/062 277/650 |
| 2009/0189358 A1 * | 7/2009 | Briscoe | F16J 15/062 277/584 |
| 2010/0052259 A1 * | 3/2010 | Lewis | F16J 15/166 277/312 |
| 2013/0069362 A1 * | 3/2013 | Miura | F16J 15/166 285/202 |

FOREIGN PATENT DOCUMENTS

| | | |
|---|---|---|
| JP | S55-022591 U | 2/1980 |
| JP | S57-033253 Y2 | 7/1982 |
| JP | S58-036660 U | 3/1983 |
| JP | H10184927 A | 7/1998 |
| JP | H11315925 A | 11/1999 |
| JP | 2000-223557 A | 8/2000 |
| JP | 2002-161983 A | 6/2002 |
| JP | 2005-317708 A | 11/2005 |
| JP | 2011-021723 A | 2/2011 |
| JP | 2011-089861 A | 5/2011 |
| JP | 2011-220395 A | 11/2011 |
| JP | 2011-236943 A | 11/2011 |
| WO | 2006-070568 A1 | 7/2006 |
| WO | 2015-136777 A1 | 9/2015 |

OTHER PUBLICATIONS

Extended European Search Report dated Apr. 9, 2018 (corresponding to EP15845454.6).
Japanese Office Action dated Jul. 24, 2018 (corresponding to JP 2017-017390).

* cited by examiner

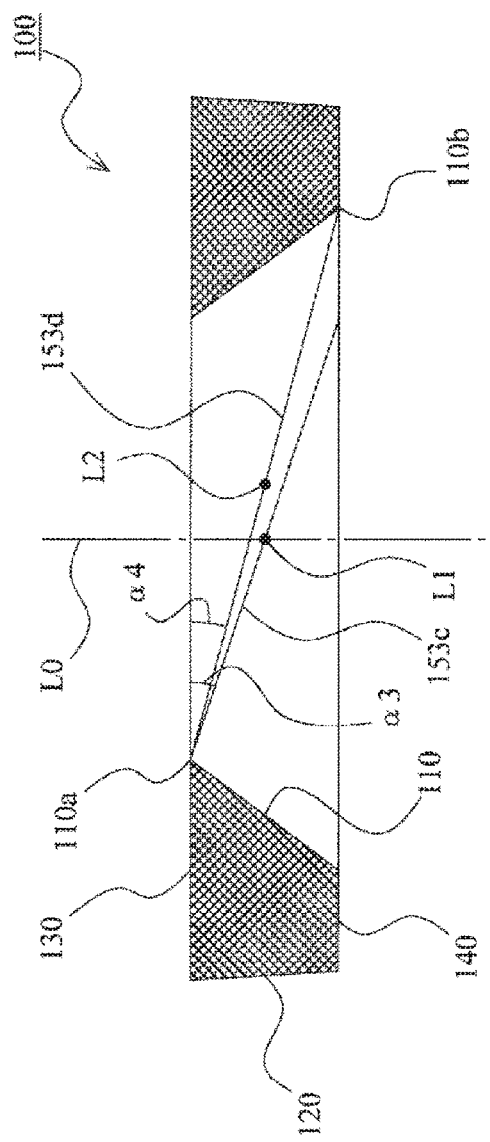

SEALING STRUCTURE

CROSS-REFERENCE TO RELATED APPLICATIONS

This application is a National Stage of International Application No. PCT/JP2015/074388, filed Aug. 28, 2015 (now WO 2016/047369A1), which claims priority to Japanese Application No. 2014-194418, filed Sep. 24, 2014. The entire disclosures of each of the above applications are incorporated herein by reference.

FIELD

The present disclosure relates to a sealing structure including a backup ring.

BACKGROUND

A sealing structure is conventionally known which includes a resin backup ring provided adjacently to a seal ring formed of a rubber-like elastic body and at a position further toward a lower pressure side than the seal ring. In the sealing structure, the backup ring allows suppression of stick-out of a part of the seal ring from an annular groove in which the seal ring is installed. Consequently, possible damage to the seal ring can be suppressed. However, in general, a cut portion is formed in the backup ring at one position in a circumferential direction so as to facilitate installation. Thus, a part of the seal ring may be sandwiched between cut surfaces of the cut portion, leading to damage to the seal ring. Therefore, the seal ring still has room for improvement.

CITATION LIST

Patent Literature

[PTL 1] Japanese Patent Application Laid-open No. 2011-21723
[PTL 2] Japanese Patent Application Laid-open No. 2011-220395
[PTL 3] Japanese Patent Application Laid-open No. 2002-161983
[PTL 4] Japanese Patent Application Laid-open No. H10-184927

SUMMARY

Technical Problem

An object of the present disclosure is to provide a sealing structure that can suppress possible damage to a seal ring because of a backup ring.

Solution to Problem

The present disclosure adopts the following means to solve the above-described problem.

That is, the present disclosure provides a sealing structure including: a shaft provided with an annular groove formed on an outer peripheral; a housing having a shaft hole through which the shaft is inserted; a seal ring formed of a rubber-like elastic body that is installed in the annular groove and that seals an annular gap between the shaft and the shaft hole; and a resin backup ring installed adjacently to the seal ring and at a position further toward a low pressure side than the sealing ring, wherein on a low pressure side of a groove bottom surface of the annular groove, a tapered surface is formed which has a diameter increasing toward the low pressure side, an inner peripheral surface of the backup ring is formed of a tapered surface that has a larger taper angle than the tapered surface formed on the groove bottom surface and that has a diameter increasing toward the low pressure side, the backup ring is disposed at a position where an annular edge portion on a high pressure side of the inner peripheral surface of the backup ring is slidable with respect to the tapered surface formed on the groove bottom surface, a cut portion that is cut in a planar shape is formed in the backup ring at one position in a circumferential direction, the cut portion is configured such that a first cutting line formed on a surface on a high pressure side of the backup ring is parallel to a second cutting line formed on a surface on a low pressure side of the backup ring and such that the cut surface is oblique to a central axis of the backup ring, and an acute angle of angles between the surface on the high pressure side of the backup ring and the cut surface is set to not less than 15° and not more than 30°, and the backup ring is formed of a resin material having Rockwell hardness of 100 or less, durometer hardness of 70 or less, and elastic modulus of 1.0 GPa or less.

In the present disclosure, the annular edge portion on the high pressure side of the inner peripheral surface of the backup ring is configured to be slidable with respect to the tapered surface formed on the groove bottom surface of the annular groove. Consequently, (substantial) line contact is enabled in the slidable portion, and thus, the backup ring can move smoothly in the direction of the central axis. This suppresses formation of a gap between the backup ring and the annular groove, and thus prevents a part of the seal ring from sticking out between the backup ring and the annular groove.

Since the cut portion is formed in the backup ring at one position in the circumferential direction, an operation of installing the backup ring in the annular groove is easy. Furthermore, since the cut portion is shaped like a flat surface by cutting, an operation of forming the cut portion is also easy. In other words, the cut portion can be formed by one cutting operation using a general cutting edge.

Furthermore, the acute angle of the angles between the surface on the high pressure side of the backup ring and the cutting surface is set to not less than 15° and not more than 30°. Consequently, when the seal ring is pressed toward the backup ring, with the cut surfaces at the cutting portion being separated from each other, a tip portion of the backup ring forming the acute angle in the cutting portion is deflected toward the low pressure side. This enables to prevent a part of the seal ring from being trapped in the gap between the cut surfaces in a sandwiching manner. Moreover, the backup ring is formed of a resin material having Rockwell hardness of 100 or less, durometer hardness of 70 or less, and elastic modulus of 1.0 GPa or less. Consequently, the tip portion of the side of the backup ring forming the acute angle can be easily deflected.

A surface that is parallel to the central axis and that includes the second cutting line may be positioned radially outward of the annular edge portion on the high pressure side of the inner peripheral surface of the backup ring.

Consequently, even if the bore diameter of the annular edge portion on the high pressure side of the inner peripheral surface of the backup ring is small, the acute angle of the angles between the surface on the high pressure side of the backup ring and the cut surface can be made small.

An outer peripheral surface of the backup ring may be formed of a tapered surface having a diameter decreasing toward the low pressure side. The annular edge portion on the high pressure side of the outer peripheral surface of the backup ring may be configured to be slidable with respect to an inner peripheral surface of the shaft hole in the housing.

Consequently, (substantial) line contact is enabled in the slidable portion between the shaft hole in the housing and the backup ring, thus the backup ring can more smoothly move in the direction of the central axis.

The above-described configuration may be adopted in combination wherever possible.

Advantageous Effects of the Disclosure

As described above, according to the present disclosure, possible damage to the seal ring because of the backup ring can be suppressed.

DRAWINGS

FIG. 7 is a diagram illustrating a manner of setting the angle of the cut surface of the cut portion formed in the backup ring.

DETAILED DESCRIPTION

With reference to the drawings, an embodiment of the present disclosure will be described in detail for illustrative purposes based on an example. However, the dimensions, materials, shapes, and relative arrangements and the like of components described in the embodiment are not intended to limit the scope of the present disclosure to the dimensions, materials, shapes, or relative arrangements unless otherwise specified.

A sealing structure according to the present embodiment is configured such that an annular gap between a shaft and a shaft hole (in a housing) is sealed by a seal ring formed of a rubber-like elastic body. The shaft and the housing are concentrically arranged, and these two members may make movement (at least one of rotation and reciprocation) relative to each other or may be stationary. Furthermore, although concentrically arranged, the two members need not necessarily be constantly in a concentric state but may be in an eccentric state. Additionally, in the sealing structure in the present embodiment, one side of the direction of the central axis corresponds to a high pressure side (H), whereas the other side of the direction of the central axis corresponds to a low pressure side (L). However, a state where no difference in pressure between the opposite sides may occur. In addition, a sealing target fluid (oil or the like) may be sealed on the high pressure side (H), whereas the air may be present on the low pressure side (L), or the sealing target fluid may be sealed on both sides. Examples of equipment to which the sealing structure according to the present embodiment is suitably applicable may include an injector unit of a direct injection engine, a cylinder for construction machines, a cylinder for general machinery, and a shock absorber.

Embodiment

A sealing structure according to the embodiment of the present disclosure will be described with respect to FIG. 1 to FIG. 7.

<General Structure of the Sealing Structure>

Figure 4:
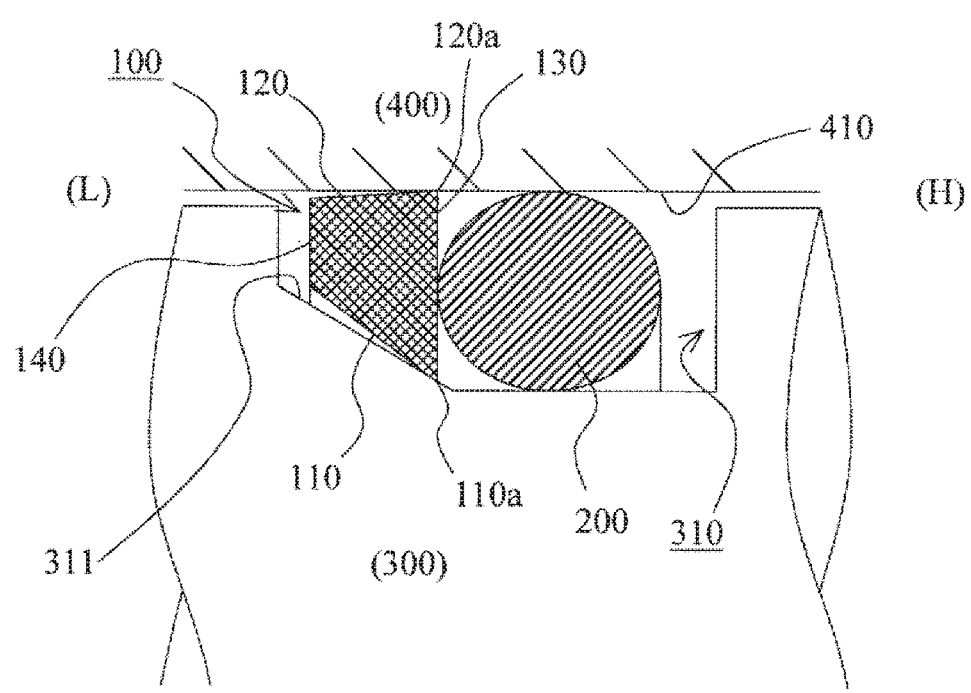
FIG. 4 is a schematic cross sectional diagram of a sealing structure according to the embodiment of the present disclosure.

A configuration of the general sealing structure according to the present embodiment will be described with reference to FIG. 4. FIG. 4 shows a schematic cross sectional view of the sealing structure according to the embodiment of the present disclosure, taken along a surface including a central axis of various members. The sealing structure according to the present embodiment includes a shaft 300, a housing 400 having a shaft hole 410 through which the shaft 300 is inserted, a seal ring 200 formed of a rubber-like elastic body (for example, NBR) that seals an annular gap between the shaft 300 and the shaft hole 410, and a resin backup ring 100 located adjacently to the seal ring 200. An annular groove 310 is formed on an outer peripheral surface of the shaft 300. The seal ring 200 and the backup ring 100 are installed in the annular groove 310. The seal ring 200 is installed on the high pressure side (H), and backup ring 100 is installed at a position further toward the low pressure side (L) than the seal ring 200. Moreover, a tapered surface 311 having a diameter increasing toward the low pressure side (L) is formed on the low pressure side (L) of a groove bottom surface of the annular groove 310. The backup ring 100 is installed at a position where the tapered surface 311 is formed. The backup ring 100 serves to prevent stick-out of a part of the seal ring 200 into a gap between an outer peripheral surface of the shaft 300 and an inner peripheral surface of the shaft hole 410 in the housing 400. The seal ring 200 according to the present embodiment is an O ring with a circular cross section.

<Backup Ring>

Figure 1:
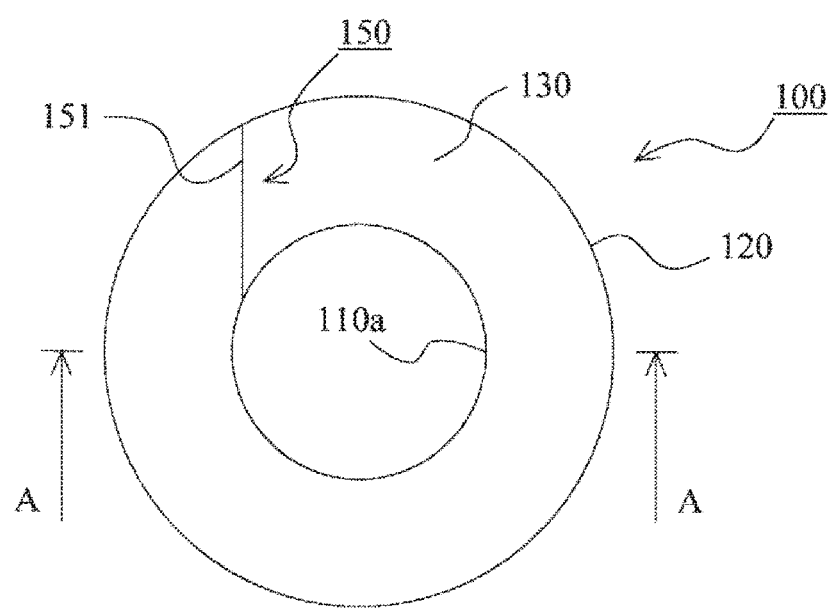
FIG. 1 is a diagram of a backup ring according to an embodiment of the present disclosure as viewed from a high pressure side.
Figure 2:
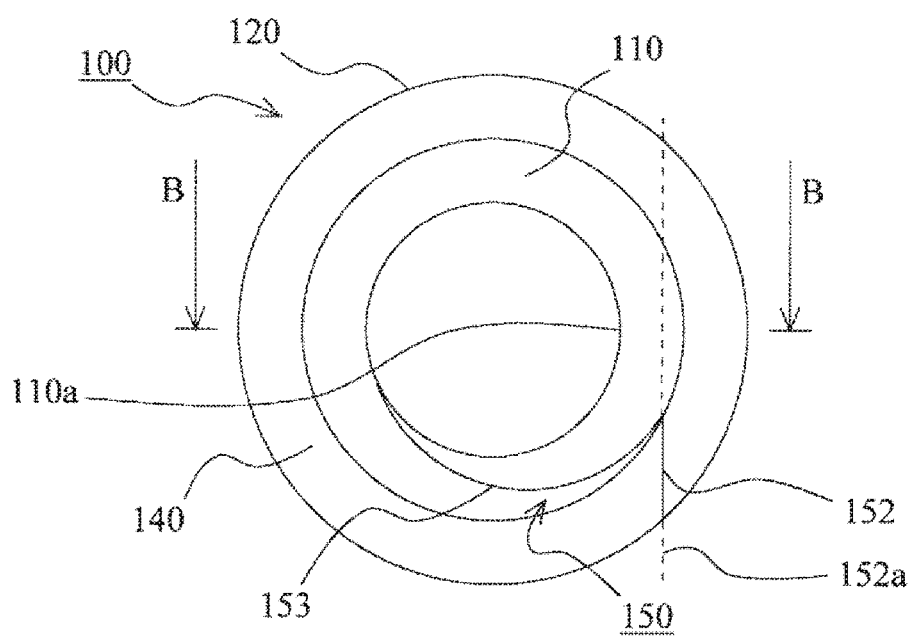
FIG. 2 is a diagram of a backup ring according to an embodiment of the present disclosure as viewed from a low pressure side.
Figure 3:
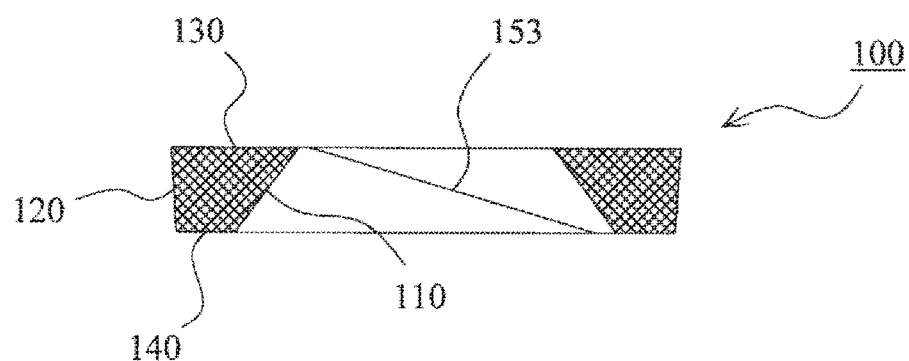
FIG. 3 is a schematic cross sectional diagram of the backup ring according to the embodiment of the present disclosure.

With reference particularly to FIG. 1 to FIG. 3, a configuration of the backup ring 100 will be described in further detail. FIG. 1 is a diagram of the backup ring 100 according to the embodiment of the present disclosure as viewed from the high pressure side (H). FIG. 2 is a diagram of the backup ring 100 according to the embodiment of the present disclosure as viewed from the low pressure side (L). FIG. 3 is a schematic cross sectional diagram of the backup ring 100 according to the embodiment of the present disclosure. FIG. 3 corresponds to an AA sectional view in FIG. 1 and a BB sectional view in FIG. 2.

A surface on the high pressure side (hereinafter referred to as a side surface 130 on the high pressure side) and a surface on the low pressure side (hereinafter referred to as a side surface 140 on the low pressure side) in the backup ring 100 according to the embodiment are both flat surfaces. An inner peripheral surface 110 of the backup ring 100 is formed of a tapered surface having a diameter increasing toward the low pressure side (L). An outer peripheral surface 120 of the backup ring 100 is formed of a tapered surface having a diameter decreasing toward the low pressure side (L).

The taper angle of the inner peripheral surface 110 of the backup ring 100 is set larger than the taper angle of the tapered surface 311 formed on the groove bottom surface of the annular groove 310. Consequently, an annular edge portion 110a on the high pressure side (H) of the inner peripheral surface 110 of the backup ring 100 is slidable with reference to the tapered surface 311 formed on the groove bottom surface (see FIG. 4). Therefore, (substantial) line contact is enabled in the slidable portion between the backup ring 100 and the annular groove 310. The sealing structure is designed such that a gap is secured between the backup ring 100 and a side surface on the low pressure side of the annular groove 310 even when the backup ring 100 moves closest to the low pressure side (L) in a usage environment (except for an abnormal case). This enables the annular edge portion 110a on the high pressure side (H) of the inner peripheral surface 110 of the backup ring 100 to be kept in (substantial) line contact with the tapered surface 311 of the annular groove 310.

As described above, the outer peripheral surface 120 of the backup ring 100 is formed of a tapered surface having a diameter decreasing toward the low pressure side (L). In contrast, an inner peripheral surface of the shaft hole 410 in the housing 400 is formed of a cylindrical surface. Consequently, the annular edge portion 120a on the high pressure side (H) of the outer peripheral surface 120 of the backup ring 100 is slidable with respect to the inner peripheral surface of the shaft hole 410 in the housing 400 (see FIG. 4). Therefore, (substantial) line contact is also enabled in the slidable portion between the backup ring 100 and the shaft hole 410 in the housing 400. In the present embodiment, the angle between the outer peripheral surface 120 and the inner peripheral surface of the shaft hole 410 is designed to be 3° (tolerance of ±2°).

In the backup ring 100 according to the present embodiment, a cut portion 150 is formed by cutting in a flat shape at one position in a circumferential direction. The cut portion 150 is formed so that the backup ring 100 can be easily installed in the annular groove 310. So-called "bias cut" is adopted for the cut portion 150 according to the present embodiment. A cut surface 153 of the cut portion 150 is a flat surface, and thus, the cut portion 150 can be formed by one cutting operation using a general cutting edge.

The cut portion 150 according to the present embodiment is configured such that a first cutting line 151 formed on the side surface 130 on the high pressure side of the backup ring 100 is parallel to a second cutting line 152 formed on the side surface 140 on the low pressure side (see FIGS. 1 and 2). The cut portion 150 according to the present embodiment is configured such that the cut surface 153 is oblique to a central axis of the backup ring 100 (see FIG. 3).

<Angle Between the Side Surface on the High Pressure Side of the Backup Ring and the Cut Surface>

Figure 5:
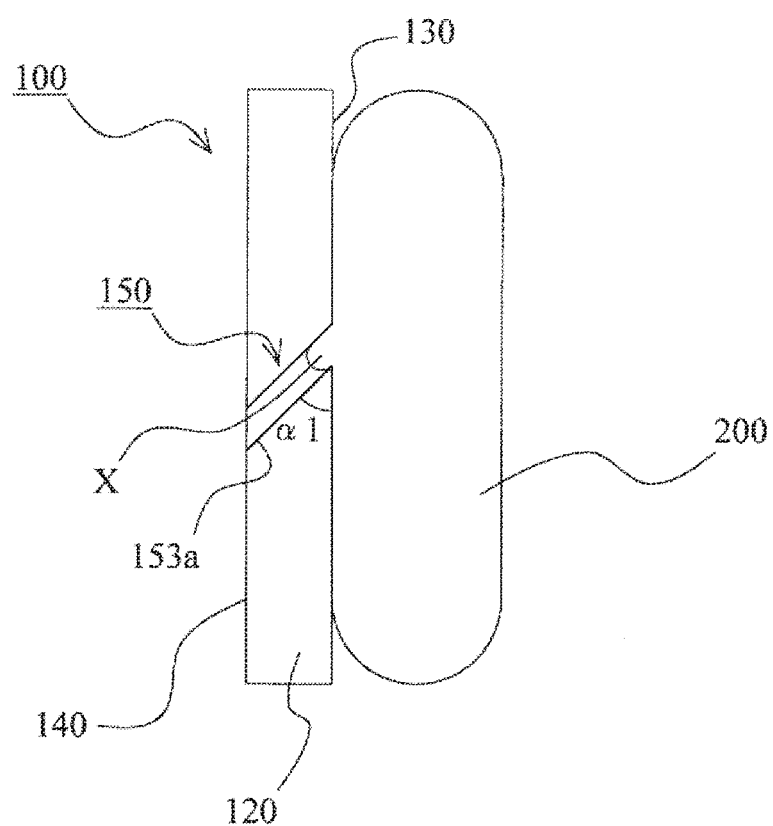
FIG. 5 is a diagram illustrating a relation between a seal ring and the angle of a cut surface of a cut portion formed in the backup ring.
Figure 6:
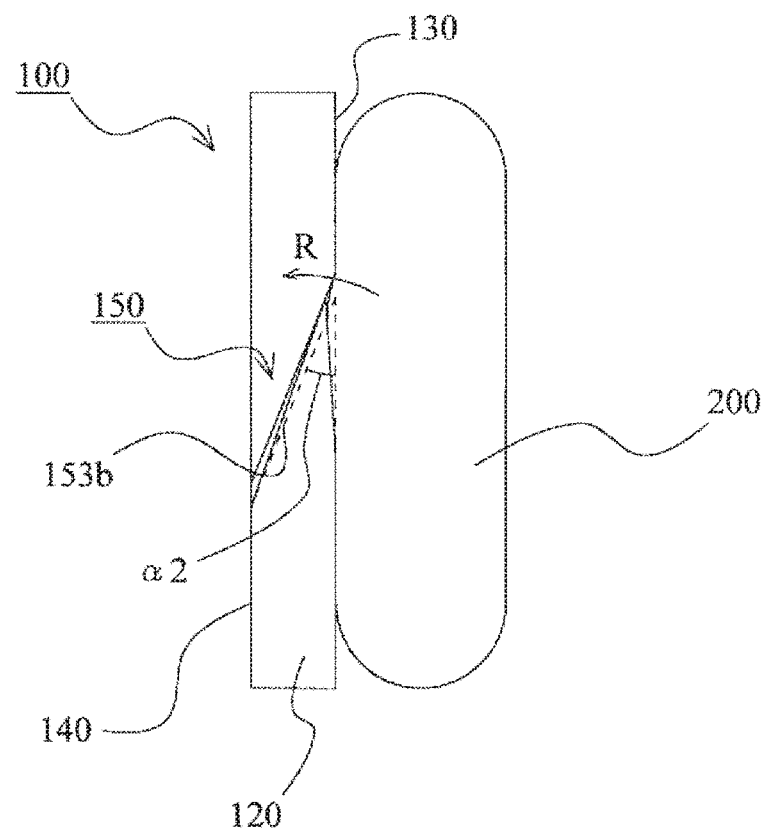
FIG. 6 is a diagram illustrating the relation between the seal ring and the angle of the cut surface of the cut portion formed in the backup ring.

With reference particularly to FIG. 5 and FIG. 6, the angle between the side surface 130 on the high pressure side of the backup ring 100 and the cut surface 153 will be described. FIG. 5 and FIG. 6 are diagrams illustrating a relation between the seal ring and the angle of the cut surface of the cut portion formed in the backup ring. FIG. 5 and FIG. 6 are diagrams of the seal ring 200 and the backup ring 100 in use as viewed from the outer peripheral surface side. FIG. 5 illustrates a case where an acute angle α1 of the angles between the side surface 130 on the high pressure side of the backup ring 100 and a cut surface 153a is 45°. In this case, a tip portion of the backup ring 100 forming the acute angle in the cut portion 150 has a relatively high rigidity. Thus, when the seal ring 200 is pressed toward the backup ring 100 while the cut surfaces of the cut portion 150 are separated from each other, a part X of the seal ring 200 is trapped in a gap between the cut surfaces in a sandwiching manner. Consequently, the seal ring 200 may be damaged.

In contrast, FIG. 6 illustrates a case where an acute angle α2 of the angles between the side surface 130 on the high pressure side of the backup ring 100 and a cut surface 153b is 22°. In this case, a tip portion of the backup ring 100 forming the acute angle in the cut portion 150 has a relatively low rigidity. Thus, when the seal ring 200 is pressed toward the backup ring 100 while the cut surfaces of the cut portion 150 are separated from each other, a tip portion of the backup ring 100 forming the acute angle in the cut portion 150 is deflected toward the low pressure side (L). In other words, the tip portion is deflected in the direction of arrow R in FIG. 6. This enables to prevent a part of the seal ring 200 from being trapped in the gap between the cut surfaces in a sandwiching manner. In FIG. 6, a dotted line illustrates a state where the backup ring 100 is not pressed by the seal ring 200. A continuous line illustrates a state where the backup ring 100 is being pressed by the seal ring 200.

Setting the acute angle α2 to not less than 15° and not more than 30° has been found suitably allows suppression of trapping of a part of the seal ring 200 in the gap between the cut surfaces. Therefore, for example, the acute angle α2 may suitably be set to 22° (tolerance of ±5°).

<Setting of the Angle of the Cut Surface>

With reference particularly to FIG. 7, setting of the angle between the side surface 130 on the high pressure side of the backup ring 100 and the cut surface 153 will be described. FIG. 7 is a diagram illustrating a manner of setting the angle of the cut surface 153 of the cut portion 150 formed in the backup ring 100.

If a bias cut is formed based on a conventional design concept, the cut portion 150 is provided such that a line that passes through the center (corresponding to a point L1 in FIG. 7) between the first cutting line 151 and the second cutting line 152 and that is parallel to the first cutting line 151 and the second cutting line 152 passes through a central axis L0 of the backup ring 100. The distance between the first cutting line 151 and the second cutting line 152 is longest when the cut portion 150 is formed such that the cut surface passes through the annular edge portion 110a on the high pressure side (H) of the inner peripheral surface 110 of the backup ring 100 (see the cut surface 153c in FIG. 7). An acute angle α3 of the angles between the side surface 130 on the high pressure side of the backup ring 100 and the cut surface 153c is smallest. As seen in FIG. 7, the smaller the bore diameter of the annular edge portion 110a on the high pressure side (H) of the inner peripheral surface 110 of the backup ring 100 is, the larger the acute angle α3 needs to be.

As described above, the acute angle of the angles between the side surface 130 on the high pressure side of the backup ring 100 and the cut surface 153c is desirably set to not less than 15° and not more than 30°. However, when the bore diameter of the annular edge portion 110a on the high pressure side (H) of the inner peripheral surface 110 of the backup ring 100 is small, the acute angle α3 may fail to be set to 30° or less.

In the backup ring 100 according to the present embodiment, the distance between the first cutting line 151 and the second cutting line 152 may be longest when the cut portion 150 is formed such that the cut surface passes both through the annular edge portion 110a on the high pressure side (H) of the inner peripheral surface 110 of the backup ring 100 and through the annular edge portion 110b on the low pressure side (L) of the inner peripheral surface 110 (see a cut surface 153d in FIG. 7). In this case, a line (corresponding to a point L2 in FIG. 7) that passes through the center between the first cutting line 151 and the second cutting line 152 and that is parallel to the first cutting line 151 and the second cutting line 152 is separated from the central axis L0 of the backup ring 100. This design enables an acute angle a4 of the angles between the side surface 130 on the high pressure side of the backup ring 100 and the cut surface 153d can be set smaller. In the above-described design, a plane 152a (see FIG. 2) that is parallel to the central axis L0 and that includes the second cutting line 152 is positioned radially outward of the annular edge portion 110a on the high pressure side (H) of the inner peripheral surface 110 of the backup ring 100.

<Material of the Backup Ring>

The backup ring 100 according to the present embodiment is formed of a resin material having Rockwell hardness of 100 or less, durometer hardness of 70 or less, and elastic modulus of 1.0 GPa or less. For example, a soft resin material such as polyamide may be suitably used.

<Advantages of the Sealing Structure According to the Present Embodiment>

In the sealing structure according to the present embodiment, the annular edge portion 110a on the high pressure side (H) of the inner peripheral surface 110 of the backup ring 100 is configured to be slidable with respect to the tapered surface 311 formed on the groove bottom surface of the annular groove 310. Since (substantial) line contact is enabled in the slidable portion, the backup ring 100 can move smoothly in the direction of the central axis. This prevents a gap from being formed between the backup ring 100 and the annular groove 310 because the backup ring 100 immediately moves in the direction of the central axis in a case where the difference in pressure between the high pressure side (H) and the low pressure side (L) fluctuates or in a case where the shaft 300 and the housing 400 are eccentric. This suppresses a part of the seal ring 200 from sticking out between the backup ring 100 and the annular groove 310.

Since the cut portion 150 is provided in the backup ring 100 at one position in the circumferential direction, an operation of installing the backup ring 100 in the annular groove 310 is easy. The cut portion 150 is cut in a planar shape, an operation of forming the cut portion 150 is easy. In other words, the cut portion 150 can be formed by one cutting operation using a general cutting edge.

The acute angle of the angles between the side surface 130 on the high pressure side of the backup ring 100 and the cut surface 153 is set to not less than 15° and not more than 30°. Consequently, the tip portion of the backup ring 100 forming the acute angle in the cut portion 150 is deflected toward the low pressure side (L) in a case where the seal ring 200 is pressed toward the backup ring 100 while the cut surfaces of the cut portion 150 are separated from each other. This prevents a part of the seal ring 200 from being trapped in the gap between the cut surfaces. The backup ring 100 is formed of a resin material having Rockwell hardness of 100 or less, durometer hardness of 70 or less, and elastic modulus of 1.0 GPa or less. Consequently, the tip portion of the backup ring 100 forming the above-described acute angle can be easily deflected. Due to the above mentioned features, trapping of a part of the seal ring 200 in the gap between the cut surfaces can be suppressed effectively. Under a condition where the acute angle of the angles between the cut surface 153 and the side surface 130 on the high pressure side of the backup ring 100 was 22° and Rockwell hardness is 113, the outer peripheral surface of the seal ring 200 was damaged. In contrast, under a condition where the acute angle of the angles between the cut surface 153 and the side surface 130 on the high pressure side of the backup ring 100 was 22° and Rockwell hardness is 85, no damage was caused to the outer peripheral surface of the seal ring 200. Under a condition where the acute angle of the angles between the cut surface 153 and the side surface 130 on the high pressure side of the backup ring 100 was 22° and durometer hardness is 70, no damage was caused to the outer peripheral surface of the seal ring 200.

The plane 152a that is parallel to the central axis L0 of the backup ring 100 and that includes the second cutting line 152 can be configured such that the plane 152a is positioned radially outward of the annular edge portion 110a on the high pressure side (H) of the inner peripheral surface 110 of the backup ring 100. Consequently, as described above, even when the bore diameter of the annular edge portion 110a on the high pressure side (H) of the inner peripheral surface 110 of the backup ring 100 is small, the acute angle of the angles between the side surface 130 on the high pressure side of the backup ring 100 and the cut surface 153 can be set small. Consequently, even in a case where the conventional design concept fails to enable the acute angle to be set to not less than 15° and not more than 30°, the above-described configuration allows the acute angle to be set to not less than 15° and not more than 30°.

The outer peripheral surface 120 of the backup ring 100 according to the embodiment is formed of a tapered surface having a diameter decreasing toward the low pressure side (L). The annular edge portion 120a on the high pressure side (H) of the outer peripheral surface 120 of the backup ring 100 is configured to be slidable with respect to the inner peripheral surface of the shaft hole 410 in the housing 400. Consequently, in the slidable portion between the shaft hole 410 in the housing 400 and the backup ring 100, (substantial) line contact is enabled. Thus, the backup ring 100 can be moved more smoothly in the direction of the central axis.

REFERENCE SIGNS LIST

100 Backup ring
110 Inner peripheral surface
110a Annular edge portion
110b Annular edge portion
120 Outer peripheral surface
120a Annular edge portion
130 Side surface on the high pressure side
140 Side surface on the low pressure side
150 Cut portion
151 First cutting line
152 Second cutting line
152a Plane (that is Parallel to Central Axis and that Includes Second cutting line)
153, 153a, 153b, 153c, 153d Cut surface
200 Seal ring
300 Shaft
310 Annular groove
311 Tapered surface
400 Housing
410 Shaft hole
L0 Central axis

The invention claimed is:
1. A sealing structure comprising:
a shaft provided with an annular groove formed on an outer peripheral;

a housing having a shaft hole through which the shaft is inserted;

a seal ring formed of a rubber-like elastic body that is installed in the annular groove and that seals an annular gap between the shaft and the shaft hole; and a resin backup ring installed adjacently to the seal ring and at a position further toward a low pressure side than the sealing ring, wherein on a low pressure side of a groove bottom surface of the annular groove, a tapered surface is formed which has a diameter increasing toward the low pressure side, an inner peripheral surface of the backup ring is formed of a tapered surface that has a larger taper angle than the tapered surface formed on the groove bottom surface and that has a diameter increasing toward the low pressure side, the backup ring is disposed at a position where an annular edge portion on a high pressure side of the inner peripheral surface of the backup ring is slidable with respect to the tapered surface formed on the groove bottom surface, a cut portion that is cut in a planar shape is formed in the backup ring at one position in a circumferential direction, the cut portion is configured such that a first cutting line formed on a surface on a high pressure side of the backup ring is parallel to a second cutting line formed on a surface on a low pressure side of the backup ring and such that the cut surface is oblique to a central axis of the backup ring, and an acute angle of angles between the surface on the high pressure side of the backup ring and the cut surface is set to not less than 15° and not more than 30°, and the backup ring is formed of a resin material having Rockwell hardness of 100 or less, durometer hardness of 70 or less, and elastic modulus of 1.0 GPa or less, wherein a surface that is parallel to the central axis and that includes the second cutting line is positioned radially outward of the annular edge portion on the high pressure side of the inner peripheral surface of the backup ring.

2. The sealing structure according to claim 1, wherein an outer peripheral surface of the backup ring is formed of a tapered surface having a diameter decreasing toward the low pressure side, and the annular edge portion on the high pressure side of the outer peripheral surface of the backup ring is configured to be slidable with respect to an inner peripheral surface of the shaft hole in the housing.

3. The sealing structure according to claim 1, wherein an outer peripheral surface of the backup ring is formed of a tapered surface having a diameter decreasing toward the low pressure side, and the annular edge portion on the high pressure side of the outer peripheral surface of the backup ring is configured to be slidable with respect to an inner peripheral surface of the shaft hole in the housing.

* * * * *